United States Patent [19]
Wolf et al.

[11] Patent Number: 4,560,367
[45] Date of Patent: Dec. 24, 1985

[54] TORSIONALLY ELASTIC COUPLING

[75] Inventors: Franz-Josef Wolf; Hubert Pletsch, both of Bad Soden-Salmünster, Fed. Rep. of Germany

[73] Assignee: WOCO Franz-Josef Wolf & Co., Bad Soden-Salmünster, Fed. Rep. of Germany

[21] Appl. No.: 544,742

[22] Filed: Oct. 24, 1983

[30] Foreign Application Priority Data

Nov. 25, 1982 [DE] Fed. Rep. of Germany ....... 3243644

[51] Int. Cl.⁴ .............................................. F16D 3/68
[52] U.S. Cl. .................................... 464/83; 192/106.1
[58] Field of Search ................................. 464/81–85, 464/87, 89, 90, 92, 74, 93; 192/106.1

[56] References Cited

U.S. PATENT DOCUMENTS

| | | | |
|---|---|---|---|
| 2,100,362 | 11/1937 | Stahle | 464/83 |
| 2,398,261 | 4/1946 | Stone | 464/83 |
| 4,252,227 | 2/1981 | Staub | 464/84 X |
| 4,300,363 | 11/1981 | Mathues | 464/87 |
| 4,504,244 | 3/1985 | Wolf et al. | 464/85 |

FOREIGN PATENT DOCUMENTS 2212468 10/1978 Fed. Rep. of Germany ... 192/106.1

Primary Examiner—Stephen Marcus
Assistant Examiner—Leo James Peters
Attorney, Agent, or Firm—Jordan and Hamburg

[57] ABSTRACT

The invention relates to a torsionally elastic coupling in which the two coupling halves are connected to one another via at least one movement-converting intermediate member and at least one spring member, which allow the two coupling halves to rotate relative to one another. To improve the service life of a torsionally elastic coupling of this type by reducing shear stress and making it possible to subject the resilient intermediate members to pressure, coupling members are inserted between the movement-converting intermediate members and the resilient intermediate members.

18 Claims, 6 Drawing Figures

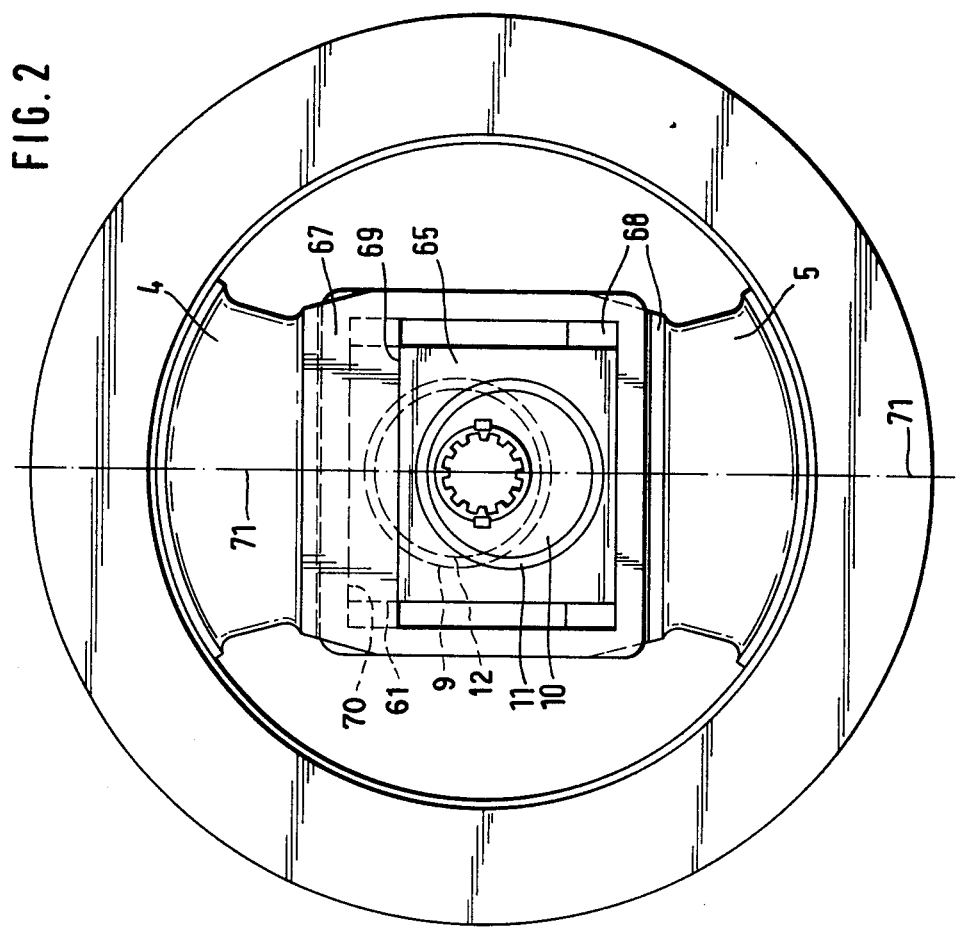
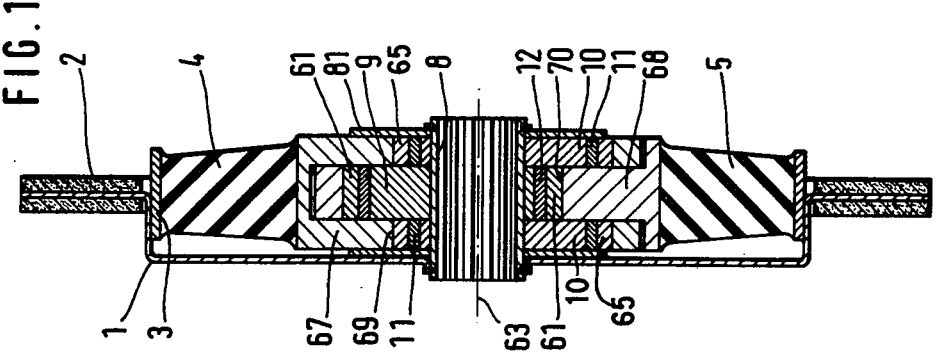

TORSIONALLY ELASTIC COUPLING

BACKGROUND OF THE INVENTION

The invention relates to a torsionally elastic coupling with at least one movement-converting intermediate member which converts rotation into translation and which is connected non-positively in terms of rotation to a first of the two coupling halves and is connected non-positively at least essentially in terms of translation to at least one resilient intermediate member which is in turn connected solidly in terms of rotation to the second of the two coupling halves.

Couplings of this type serve for the torsionally elastic transmission of torques between two shafts, especially coaxial shafts.

A coupling of the type mentioned in the introduction is known from the U.S. Pat. Nos. 4,252,226, 4,252,227, 4,296,854 and 4,300,363. Either a crank mechanism (U.S. Pat. No. 4,252,226) or a cam mechanism serves as the movement-converting intermediate member. The resilient intermediate member is, in all cases, a band or a strap made of an elastomer, which is subjected to tensile stress.

A disadvantage of this design of a torsionally elastic coupling is the known rapid fatigue and ageing of an elastomer subjected to tensile stress, especially cyclic stresses. Moreover, tearing of the elastomeric spring members results in complete failure of the coupling.

The object of the invention is, therefore, to improve a torsionally elastic coupling with a movement-converting intermediate member and with a resilient intermediate member, in such a way that a longer service life and greater reliability of the coupling are achieved because of lower material stress.

This object is achieved, according to the invention, when a coupling member which can also be regarded as a secondary intermediate member and which is articulated on the one hand non-positively to the movement-converting intermediate member on the translation side thereof, which can also be regarded as a primary intermediate member, and on the other hand non-positively to the resilient intermediate member, that is to say the actual spring member of the torsionally elastic coupling is inserted in the power transmission line between the two coupling halves of the torsionally elastic coupling described in the introduction.

First, because of the interposition of the coupling member, the residual rotational components, occurring in known couplings, can be eliminated at the output of the movement-converting intermediate member located on the translation side, that is to say, in other words, it is possible to prevent the elastomeric resilient intermediate member from being subjected not only to the intended translatory load, but also to a shearing force which, as regards fatigue and ageing of elastomeric material, is one of the most unfavorable types of stress on an elastomeric spring. Due to such shear stresses on elastomeric spring members, imbalances are additionally introduced into the coupling, and these not only adversely influence the operating characteristics of the coupling, above all at relatively high speeds, but also shorten the service life of the coupling. These influences can be eliminated according to the invention by interposing the coupling member between the movement-converting intermediate member and the resilient intermediate member. Due to the elimination of the shearing force in this way, the invention then also makes it possible to subject the elastomeric resilient intermediate member in a substantially more favorable way to translatory compression instead of tensile force. Because of the servere offset in terms of rotation, that is to say because of the strong shear components, the known cam mechanisms and crank mechanisms without a coupling member do not allow such a compressive load on the resilient intermediate member.

Because the coupling member is interposed, the point of application of the force or work (torque) transmitted from the movement-converting intermediate member to the resilient intermediate member can be transferred to the center point of the surface of action of the resilient intermediate member and, because there are no shear components, can be retained there even during operation.

According to one embodiment of the invention, the movement-converting intermediate member is either an eccentric member or a crank member, but, in particular, preferably an eccentric member, above all an eccentric disk. The coupling member is preferably a rigid connection, especially a connecting rod which is articulated rotatably to the movement-converting intermediate member, more precisely to the output of the movement-converting intermediate member located on the translation side. On the opposite side, the coupling member is preferably articulated likewise rotatably to the resilient intermediate member, for example to a bearing fastened on a thrust plate, the entire surface of which is connected to the resilient intermediate member. When the movement-converting intermediate member is preferably an eccentric disk, the coupling member is preferably a connecting rod, one eye of which engages rotatably around the eccentric disk on the outside, preferably with bearing roller members being interposed, and the other eye of which is mounted rotatably or pivotably on the resilient intermediate member.

As already mentioned in the introduction, the essential advantage of the interposed coupling member is that, according to one embodiment of the invention, the movement-converting intermediate member and the coupling member are preferably connected to one another in such a way that, when the two coupling halves are rotated relative to one another, the resilient intermediate member is subjected to a compressive force, that is to say, the spring element is not subjected to either tensile stress or a shearing force, or at least a significant shearing-force component. Thus, the mild stressing of the spring element under pressure is noticeably favorable not only as regards elastomeric springs, but also in the equivalent use of metal springs which in virtually any design are more resistant and have greater durability under compressive stress than under tensile stress and/or shearing stress.

The torsionally elastic coupling according to the invention is preferably used, in particular, in automobile construction, and specifically above all in the drive system, especially between the driving plate and the output shaft of a clutch or an automatic transmission, and as a suppressor, especially a low-frequency suppressor.

Furthermore, an essential advantage of all the designs of the coupling according to the invention is that torsionally elastic twist angles of up to ±180° relative to a zero position of the two coupling halves relative to one another can be achieved.

The force exerted radially on the center of the surface of action of the spring member during torque transmission from the first coupling half to the second coupling half is increasingly counteracted by the spring force of the spring member until the load torque at the second coupling half on the output side and the drive torque at the loaded coupling half on the input side are in torque equilibrium. The size of the twist angle at the moment of this torque equilibrium, that is to say the angle through which the two coupling halves are twisted relative to one another, depends on the adjustment of the coupling, that is to say, for example, on the matching of the eccentricity of the eccentric and the spring characteristic of the spring member used. For example, the softer the spring characteristic of the spring element, with a predetermined eccentricity of the eccentric member, the greater will be the twist angle established at a specific torque in torque equilibrium. Again, the greater this twist angle in the torque equilibrium range, the "softer" is the torque transmission behavior of the coupling in the torque/twist angle characteristic, that is to say, the spring characteristic of the torsionally elastic coupling.

For normal operation, the eccentric geometry and the spring characteristics of the spring members are appropriately designed so that at the maximum torque which is to be expected under normal operating conditions and to which the coupling is subjected, a twist angle in the range of approximately 60° to 100° is established. The angular amount of approximately 80° to 120°, which remains between the twist angle adjusted and set in this way and the maximum possible twist angle of 180°, serves for soft impact-free overload protection.

Thus, for example, a coupling designed for a twist angle of 90° at maximum torque in normal operation can readily be subjected to substantially greater abrupt torques than the maximum torque to be expected in normal operation, without resulting in impacts, shocks or tearing in the output shaft, since such torque shocks can be absorbed by the torsionally elastic coupling with a gentle progression of the characteristic, but impact-free up to a twist angle of 180°, that is to say double the amount of the normal maximum twisting angle of 90° envisaged in the example assumed here. When torques which exceed even this safety range are introduced into the coupling, the coupling then merely "slips through". When the two clutch halves are rotated relative to one another through an angle greater than 180°, the resilient intermediate member or members are increasingly relieved of stress, specifically until, after the relative rotation of the two clutch halves through 360° in relation to the stress-relieved zero position of the coupling has been completed, this zero position is reached again and the increasing radial stress on the spring member or members, which characterizes the normal operation of the coupling, reappears.

Consequently, in the embodiment described above, the torsionally elastic coupling according to the invention provides an impact-free, non-destructive and absolutely functionally reliable overload protection for power transmission, which can be described as ideal.

Alternatively, however, the above-described slipping-through of the coupling in the event of overloading can also be limited by stop means, such stop means limiting either the radial spring excursion of the spring members or the relative rotation of the two coupling halves by means of a claw stop. Such stop means will be appropriate in cases where a right-angled termination of the spring characteristic of the coupling is not harmful and/or is acceptable and where smaller reserve ranges of the twist angle are to be or have to be used because of larger twist-angle ranges for normal operation. Thus, such stop means will therefore be provided preferably when the coupling is designed, for example, for a twist angle of 170° for the maximum torques to be expected during normal operation. For safety reasons also, it will often be necessary to prevent the coupling from slipping through by using stop means, for example in elevator installations.

A relative rotation between the coupling half located on the drive side and the coupling half located on the output side is converted, for example when the clutch halves are arranged coaxially relative to one another, first via the primary or movement-converting intermediate member preferably designed as an eccentric member. An eccentric member of this type, which is connected solidly in terms of rotation of the first coupling half, can either be made in one piece or consist of a group of eccentric disks succeeding one another axially. This design is possible both for a single eccentric member, and correspondingly also a single resilient intermediate member, and for several spring members which are arranged at the same angular distance from one another and to which corresponding angularly offset eccentricities of a corresponding number of eccentrics are then assigned on the first coupling half. As a rule, in this case, an eccentric member acting as a movement-converting intermediate member is assigned to each spring member. For the purpose of the flux of force through the coupling, all these paths of action lie parallel to one another.

The spring members are preferably made of reinforced or non-reinforced elastomer. However, they can also be made of spring steel and, for example, can have the form of helical springs, elliptic springs or leaf springs with a specially adapted shape. When an elastomer is used to make the spring members, the compressive strength of the elastomer can be increased in a way known per se by vulcanizing—in intermediate plates to prevent transverse extension. When the coupling is designed with coupling halves arranged coaxially and concentrically, the spring members are preferably designed in the form of shell elements of at least substantially cylindrically curvature. Each of these elastomeric shell elements is connected solidly in terms of rotation to one coupling half, preferably that which is radially outside, by means of one of its cylindrically curved outer surfaces, specifically, for example, screwed, glued and/or vulcanized, preferably attached positively to it, especially attached or clipped on by inserting it in the axial direction. On its opposite, that is to say preferably radially inner, shell surface, the spring member has a supporting or bearing element to which the coupling member, for example a sliding device or a connecting rod, is articulated. The useful twist angle of the two coupling halves relative to one another, that is to say their possible twist angle when a corresponding torque is introduced, can, in the case of an impact-free construction, also extend up to a range of 360° or beyond, although when several spring members are used their axial offset must be taken into account.

The resilient intermediate members, whether steel springs of a wide variety of designs or elastomeric bodies, can be arranged in the non-loaded coupling with either negative or positive prestressing or without prestressing. Negative prestressing means, here, for example tensile prestressing of the spring element when this is subjected to pressure. On the other hand, tensile prestressing of the spring member would be positive prestressing if the spring member is to be subjected to tension during the normal operation of the coupling. The type of prestressing or, if appropriate, the use of non-prestressed coupling spring members depends on the requirements of the particular intended use, more precisely on the spring characteristic which is expected from the coupling in a particular case. When, for example, a mass-produced coupling is to be put to different uses with different adjustments, this can be achieved in a specially advantageous way by enclosing the spring members, for example elastomeric bodies, in a cage which engages around them on the outside and is part of the coupling half or is connected positively thereto, and the diameter of this cage can be varied within the desired ranges by suitable tightening means or engagement means. If, for example, a specific coupling is designed to transmit a torque of 100 Nm with a twist angle of 90° and if the same coupling is to transmit a torque of, for example, 130 Nm with the same spring angle of 90°, it is necessary, in a coupling designed in this way as a cage coupling, merely to tighten the cage gripping around and prestressing the clutch spring members, in order to satisfy these conditions.

When rubber springs or rubber/metal springs are used as spring members, the torque/twist-angle characteristic, that is to say the spring characteristic of the torsionally elastic coupling, can then be varied and adjusted in an especially simple way either for experimental purposes or for mass production, when, in the case of coupling halves arranged concentrically in a radial plane, the spring members are designed as exchangeable elements which can be inserted in an axial direction and fixed positively in the direction of rotation, especially as a rubber/metal spring with at least one radially outer metal plate and a radially inner metal plate fixing the spring member. By various combinations of such individual elements, the characteristics can be designed and adapted as desired, and in particular can also be different in the two opposing directions of rotation of the relative rotation of the two coupling halves in relation to one another. Consequently, when the coupling is used in automobile construction, for example different spring characteristics of the coupling can be provided for forward movement and reverse movement by inserting appropriate rubber springs between the two coupling halves.

In axial section, the rubber/metal springs can basically be designed as desired according to the particular knowledge acquired in this sector of construction. Thus, the elastomer cross-section of the rubber springs in the axial direction can, for example, be made essentially rectangular or V-shaped with the tip pointing radially inwards or outwards or with one or more inner cavities or shock-absorbing spaces.

When the coupling is loaded, that is to say when work energy is introduced at one of the coupling halves, the elastomer of the rubber spring, if this is used as the resilient intermediate member of the coupling, is preferably subjected to pressure during normal operation. As a result, the elastomer bulges out in the axial direction in the form of a beaded ring, and under certain circumstances in specific uses, for example heavy-vehicle construction, this can result in too "soft" a spring characteristic of the coupling, that is to say in too weak a progression of the transmitted torques as a function of the twist angle. If required, this situation can be remedied, that is to say the spring characteristic can be stiffened, hence given a stronger progression, by enclosing the coupling, or at least the axially lateral non-loaded rubber ring surfaces of the rubber springs or rubber/metal springs which lie in the radial plane, on both sides by means of plates in the manner of a capsule or a cage. This encapsulation can be carried out in such a way that, when the coupling is relieved of stress, that is to say without any work energy introduced into the coupling, the lateral ring surfaces of the rubber springs maintain a certain distance from the lateral cage plate or, alternatively, rest directly against the inner wall of the cage plate. In the first case, when the coupling is stressed, a characteristic which is first soft and then, when the bulging rubber rests against the cage plate, increasingly progressive is achieved, whilst in the second case a spring characteristic of the coupling, which is firm from the outset, that is to say strongly progressive, is achieved by a reduction in the freely deformable non-loaded surface of the rubber spring. Especially when rubber-spring members fastened releasably and exchangeably, with different Shore hardnesses and different geometrical forms and especially with different distances from the inner walls of the capsule plates or cage plates are used, a practically unlimited variety and precision adjustment of desired spring characteristics of the coupling can be achieved as a result. Also, when the spring elastomer is encapsulated in this way so as to be closed off to a limited extent on all sides, such a strongly progressive curve of the spring characteristic can be adopted and achieved and can be designed, as it were, as a stop, and consequently a greater twist angle of the coupling can be utilized.

Whereas an eccentric member connected solidly in terms of rotation of the first coupling half is preferably used for the movement-converting intermediate member, several alternatives are available for the coupling member. Either this is a sliding device, especially a sliding block, which is connected to the eccentric in a movement-converting manner and can be displaced in two directions of movement. For the purpose of stressing the spring member in a manner free of shearing force, particularly the sliding direction which is possible transversely or perpendicularly to the zero-axis position or, respectively, to the axis of the center of the surface of action of the clutch spring member is important here. As a further alternative which is used for preference, the coupling member is a connecting rod which is connected to the eccentric on the first coupling half by means of its larger eye in the manner of a roller bearing or plain bearing. By means of its second, normally smaller eye, the connecting rod is connected firmly but pivotably to the radially inner bearing shell of the corresponding spring member, for example by means of a journal or bolt mounting.

Preferably the torsionally elastic coupling is designed especially with two spring members located diametrically opposite one another and with associated movement-converting intermediate members, in such a way that, in the position of rest when the clutch is non-loaded, there is a zero-axis position, by which is meant an axis which passes through the dead centers of the eccentric and through the center of the surface of action of the coupling spring members and relative to which the coupling parts are preferably made symmetrical.

When the coupling member is designed as a sliding device or sliding block, the form of a rectangular plate is preferably chosen for this. This plate is connected directly to the eccentric radially inwards in the direction of the axis of rotation of the first coupling half, for example via a roller-bearing ring. To prevent the transmission of force components which deviate from the center of the surface of action of the spring member and which would represent a shear stress for the coupling spring member, the sliding block is mounted in a slide guide. This slide guide which can be designed to resemble a cage is rigidly connected to the spring member on the other side, for example by being vulcanized-on, riveted or in another way. It is especially important, here, as regards the bearing surface for the sliding block, that the former should have the best possible sliding properties to keep the friction losses on this surface as low as possible.

The sliding surface between the cage-like slide guide and the sliding block moved by the eccenter is made preferably straight or plane. The two sliding surfaces preferably consist of a low-friction material, and a film layer promoting the sliding properties can also be applied in addition.

When the coupling member is designed as a connecting rod which is articulated to a radially inner bearing shell of the spring member at a point, for example via a pin, the force components resulting in the spring member being subjected to shearing force are eliminated virtually completely because the connecting rod is pivotable on the inner bearing shell of the spring member. Slight shear stresses which possibly still exist can be ignored in comparison with the deflecting forces acting radially in the center of the active surface of the spring member. In contrast to the use of a sliding block as a coupling member, the radially inner bearing of the spring member is, when a connecting rod is used, preferably designed as a cylinder-shell segment, since in this form force can be applied centrally in the most favorable way. In the design with a connecting rod, an axially slightly offset arrangement of the connecting rod is suitable for achieving a simple construction. In this case, the eccentric member can, for example, be made in one piece, the individual eccentric being offset axially approximately by the amount of their width and offset angularly by approximately 180°.

Depending on the zero position of the eccentric, by which is meant the arrangement of the greatest or least eccentricity of the eccentric in relation to the corresponding spring member, the spring member can basically be subjected either to tension or to pressure, as seen from its position of rest. However, to protect the material, the resilient intermediate member is preferably exposed to compressive stress.

On the basis of a spring member which is not prestressed in any direction and on the basis of arranging the greatest eccentricity of the eccentric in the zero position on the side facing away from the spring member, this spring member is subjected to pressure during the rotational movement of the eccentric. Inasmuch as the eccentricity of the eccenter in the zero position is in the position geometrically nearest to the center of the surface of action of the spring member, the spring element is subjected to tension when the eccentric rotates.

The torsionally elastic coupling according to the invention is characterized by an unusually high degree of adaptability, specifically both as regards the twist angles to be adopted and as regards the torques to be transmitted and the design size. Because of these properties, the torsionally elastic coupling according to the invention can be used in virtually any sector of technology wherever torques are to be transmitted in a torsionally elastic manner. Above all, the coupling can be used as a spring member in drive systems, and at the same time it can also serve as an effective overload protection. However, the torsionally elastic coupling according to the invention has assumed its greatest importance at the present time in automobile construction where it can be used, above all, for cushioning torque shocks at low and extremely low engine speeds. The torsionally elastic coupling according to the invention can be used especially advantageously in clutches customary nowadays in automobile construction, specifically between the driving disk or clutch disk of the clutch and the output shaft of the clutch or input shaft of the gearbox.

Because of the large twist angles, the extreme robustness and long service life and the spring characteristics which can be adjusted virtually in any way desired, the torsionally elastic coupling according to the invention is also preferably used as a suppressor, especially a low-frequency suppressor, in automobile construction.

The invention is explained in more detail below with reference to several diagrammatic exemplary embodiments in conjunction with the drawings.

BRIEF DESCRIPTION OF THE DRAWINGS

FIG. 1 shows an axial section through a torsionally elastic coupling which in principle has two coaxial coupling halves and the coupling member of which is designed as a sliding device;

FIG. 2 shows an axial plan view of the coupling according to FIG. 1 from the right, with the two spring members, the axial guide plate for the intermediate members being omitted;

DESCRIPTION OF THE PREFERRED EMBODIMENTS

Figure 4:
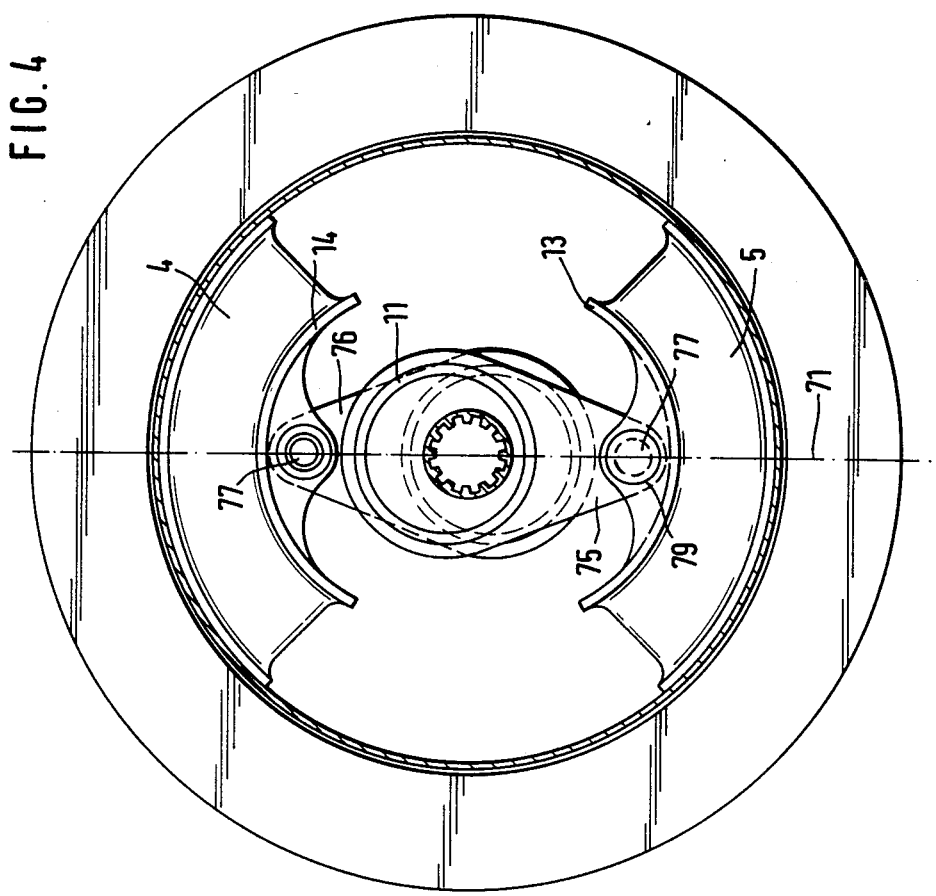
FIG. 4 shows an axial plan view of the exemplary embodiment according to FIG. 3 along the section line IV—IV.

The Figures show exemplary embodiments of the torsionally elastic coupling as a component of a clutch for an automobile. In FIGS. 1 and 2, a driving disk 1 with clutch linings 2 is solidly fastened to a cylindrical steel ring which forms one, specifically the second, coupling half 3 of the torsionally elastic coupling. Located diametrically opposite one another, two elastomeric bodies 4, 5 are vulcanized solidly in terms of rotation of the inside of the annular coupling half 3 and act as elastic resilient intermediate members of the torsionally elastic coupling. The elastomeric bodies 4, 5 have at least substantially the form of cylindrical part shells. In the design of the coupling with the sliding device according to FIGS. 1 and 2, this cylindrical part-shell form is limited to the region of fastening to the second coupling half 3. The radially inner part of the elastomeric body 4 is connected, in a surface extending in a straight line, to the part of the slide cage 67 facing the elastomeric body 4.

The transmission-shaft sleeve of the clutch serves as the first coupling half 8 of the torsionally elastic coupling. This first coupling half 8 is connected solidly in terms of rotation to two eccentric disks 9, 10 which are made fork-toothed in the example according to FIG. 1 for reasons of mass-balancing. In the example according to FIGS. 1 and 2, the eccentric disks 9, 10 are arranged offset by 180° relative to one another. The fork-shape encompassed two axially spaced parts which form the outer eccentric 10 with its greatest eccentricity pointing downwards. When the eccentric 10 rotates, a sliding block 65 connected to it via an annular roller bearing 11 experiences both a radial movement component acting on the upper coupling spring member 4 and a movement component extending transversely thereto. In the example according to FIGS. 1 and 2, the sliding block 65 forms a secondary intermediate member has the form of a rectangular plate. Here, the sliding block 65 rests against a sliding surface 69 of the slide cage 67. The sliding surface 69 extends essentially perpendicular to the zero axis or the axis of the center 71 of the surface of action. Whereas the slide cage 67 with the sliding block 65 provides direct guidance, in the direction of the zero axis, via the upper sliding surface 69 and, if appropriate, also via a lower sliding surface, in the direction of movement perpendicular to the zero axis, that is to say in a horizontal direction according to FIG. 2, there is no limiting of the movement of the sliding block 65 by the slide cage 67. Movement in this direction is limited solely by the maximum displacement of the eccentric 10.

To ensure better guidance of the sliding block 65, the slide cage 67 is designed like a square frame, as shown in FIG. 2. However, to achieve a better connection with the coupling spring member 4 and a corresponding torque transmission, the region of the frame of the slide cage 67 which faces the coupling spring member 4 is made thicker in comparison with the opposite end. The radial inner part of elastomeric body 5 is connected to another slide cage 68 which has a sliding surface 70 which engages another sliding block 61, the sliding block 61 being connected to the eccentric disk 9 via a bearing 12; the interrelationship and function of the eccentric disk 9, bearing 12, sliding block 61, slide cage 68, and sliding surface 70 being the same as that of the eccentric disk 10, bearing 11, sliding block 65, slide cage 67 and sliding surface 69, respectively, as previously described. Whilst the fork-shaped slide cage 67 and the corresponding primary and secondary intermediate members as well as the plain bearing 11 are fixed against outward axial displacement by means of axial guide plates 81 attached on both sides, the fork-shaped slide cage 67 and the corresponding intermediate members perform this function for the inner eccentric 9 and for the plain bearing 12, sliding block 61 and slide cage 68 associated with this.

When the eccentric member 10 connected firmly to the first coupling half 8 as an input shaft is made to rotate, it transmits this rotation to the sliding block 65. As a result of the contact of the sliding block 65 and the slide cage 67 with the upper sliding surface 69 which has very good sliding properties, that is to say a very low coefficient of friction, the displacement of the eccenteric member 10 in a horizontal direction according to FIG. 2 is converted into a corresponding sliding movement of the sliding block 65 in the slide cage 67. However, the displacement which is essential for the spring characteristic of the coupling spring member 4 takes place in a radial direction towards the coupling spring member 4 in the axis of the center 71 of the surface of action, the sliding block 65 together with the slide cage 67 being lifted, in the illustration according to FIG. 2, and thereby initiating a compressive stress on the coupling spring member 4. In the example according to FIG. 2, this compressive stress would continue up to the top dead center of the eccenter member 10. The relatively long straight guide line on the sliding surface 69 between the sliding box 65 and the slide cage 67 ensures that as uniform a force as possible, extending parallel to the axis of the center 71 of the surface of action, is exerted on the coupling spring member 4, so that shearing forces in the coupling spring member are avoided virtually completely, and consequently the service life of the coupling as a whole can be considerably improved. The eccentric 9, sliding block 61, slide cage 68 with the sliding surface 70, and coupling spring member 5 operate in a similar manner to the previously described eccentric 10, sliding block 65, slide cage 67 with the sliding surface 69 and coupling spring member 4, respectively. In the example according to FIGS. 1 and 2, therefore, when subjected to torque from the first coupling half 8, the appropriate coupling spring member 4 or 5 is subjected almost exclusively to a radially directed deforming compressive stress and not to any shear stress. This is assisted by the fact that the individual coupling spring members 4 and 5 are made somewhat thicker in the center of the surface of action that at the lateral edges of the elastomeric members which basically represent a segment of a cylinder shell.

Figure 3:
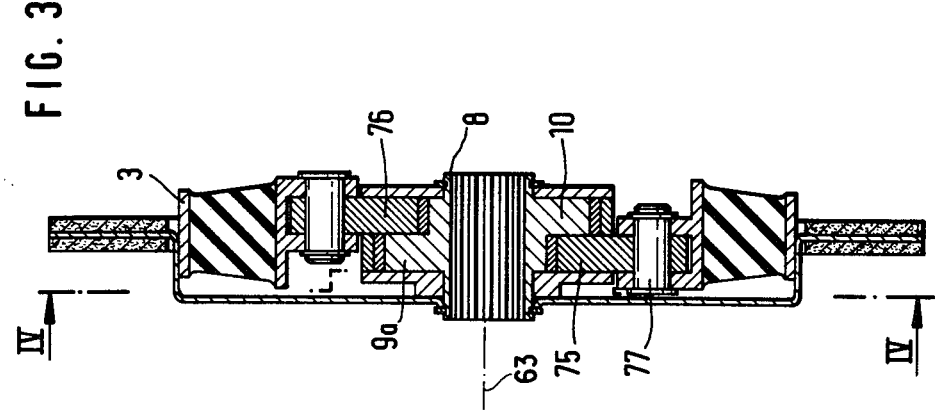
FIG. 3 shows an axial section through another embodiment of the coupling with connecting rods as coupling members, this embodiment being designed for subjecting the spring members to compressive stress.

FIGS. 3 and 4 illustrate an exemplary embodiment of the torsionally elastic coupling in which the coupling member in each case takes the form of a connecting rod 75 and 76. According to FIG. 4, one connecting rod 75 is guided on one eccentric 9a via an appropriate annular plain bearing 11. The other connecting-rod eye 79, the lower one in FIG. 4, is connected via a bolt 77 to a bearing shell 13,14 which has the form of a part circle, especially approximately a 90° segment. This bearing shell or rigid means 13,14 is connected, for example vulcanized-on, to the corresponding part circle of a cylindrical surface of the elastomer used as the coupling spring member 5.

Since the greatest eccentricity of the eccentric member 9a is, as it were in the position of rest according to FIG. 4, in the position furthest away from the spring members 4,5, any movement about the axis of rotation 63 which diverges from this results initially in a compressive stress on the associated spring member 45.

The transmission of torque and the transmission of force to the spring members 4 and 5 takes place, in the exemplary embodiment according to FIGS. 3 and 4, via the interposed coupling members, namely the connecting rods 75 and 76 respectively. Whereas in a torsionally elastic coupling without a coupling member the loads applied at an angle to the zero axis or to the axis of the center of the surface of action of the individual spring members result in shearing forces and in the long term in more rapid wear of these spring members, the shear stress and the forces causing this and exerted at an angle to the axis of the center of the surface of action or to the zero axis are reduced, when a connecting rod is used as the coupling member, so that they can be ignored in comparison with the radial component giving rise to the compressive stress on the coupling spring member.

In the exemplary embodiment according to FIG. 4, the larger connecting-rod eye is provided on the eccentric 9a and the corresponding plain bearing 11, whilst the smaller connecting-rod eye 79 receives a bolt 77 of the lower spring member. At the same time, as shown in FIG. 3, the two eccentrics 9 and 10 provided in this exemplary embodiment are arranged solidly in terms of rotation as a unit on the pivot pin of the first coupling half 8. Because of the slight axial offset of the two eccentrics members 9 and 10, the corresponding coupling member also engages, slightly offset axially, on the bearing shells 13 of the spring members 4 and 5. As a modification to the pivotal articulation of the connecting rod 75 on the bearing shell 13 via the appropriate bolt 77, as illustrated in FIG. 3, the bolt mounting in the bearing shell of the spring member, which is effected on both sides of the connecting rod, can take place so that the entire axial width of the spring member is covered.

Figure 6:
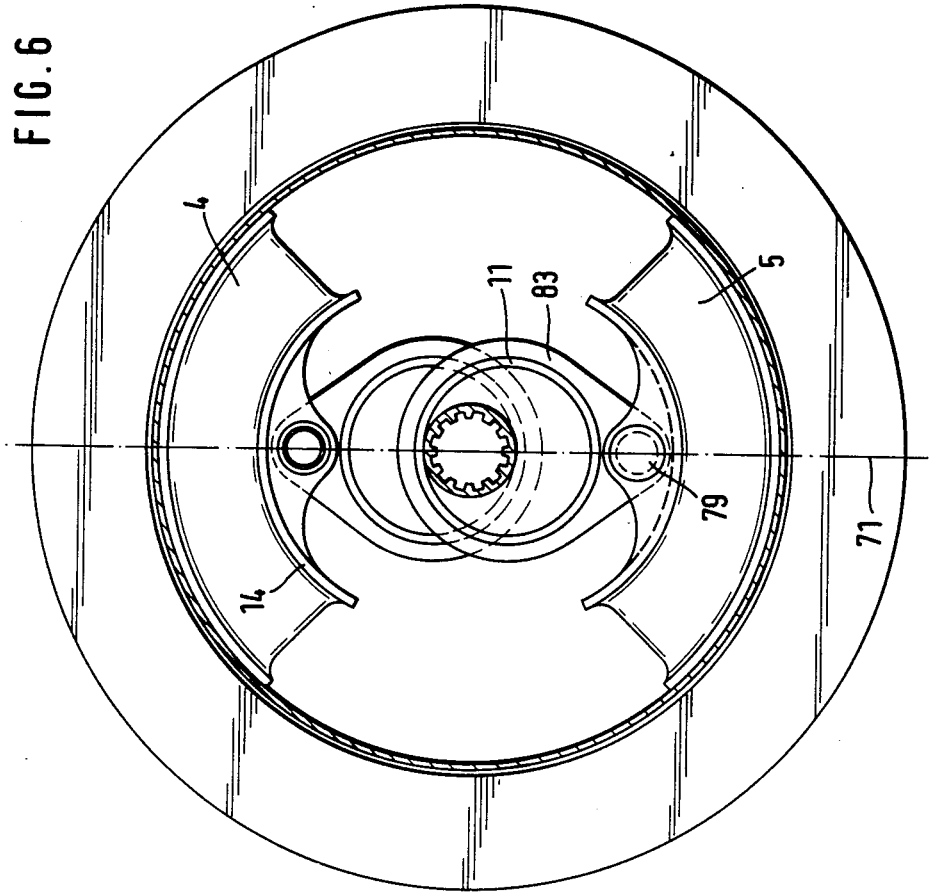
FIG. 6 shows an axial plan view of the exemplary embodiment according to FIG. 5 along the section line VI.
Figure 5:
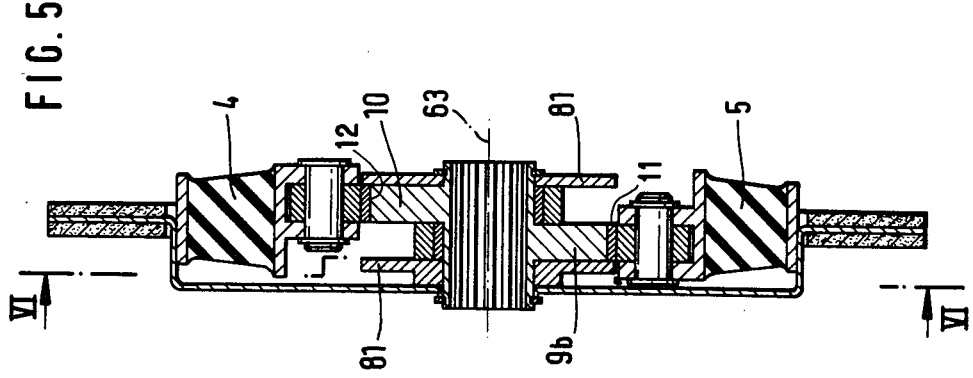
FIG. 5 shows an axial section through a modified embodiment of the coupling according to FIG. 3, in which the arrangement of the connecting rods is designed for subjecting the spring members to tensile stress.

Whereas FIGS. 3 and 4 illustrate diagrammatically an elastic coupling which during rotation of the eccentrics member 9 or 10 causes, from the position of rest, a compressive stress on the corresponding spring members 5 and 4 respectively, FIGS. 5 and 6 relate to an example of tensile stress.

The essential difference from the example of FIGS. 3 and 4 is that the connecting rod serving as the coupling member is in the position of rest in the bottom dead center of the eccentric, the greatest eccentricity of which is, according to FIG. 6, in a position near to the spring member, that is to say located opposite the latter. On the assumption that in this position the spring member 5 is not subject to any prestressing of the elastomer, any rotation of the eccentrics member 9b which diverges from the position shown in FIG. 6 immediately results in tensile stress in the spring member 5. The same also applies to the second spring member 4 located diametrically opposite and acting in parallel. In a similar way to the example according to FIG. 3, axial guide plates 81 are also attached to the eccentrics unit in the exemplary embodiment according to FIG. 5, for example by means of a spring ring, to prevent axial displacement of the plain bearings 11 and 12, these guide plates 81 extending radially further than the corresponding plain bearings.

We claim:

1. A rotationally elastic coupling comprising two rotatable half coupling means, an eccentric disc mounted on one of said half coupling means, said eccentric disc being displaced along a translatory path of travel upon rotation of said one half coupling means, resilient means mounted on said other half coupling means, an intermediate means operably connected to said eccentric disc via a bearing disposed about said eccentric disc and to said resilient means for transforming the translatory path of movement of said eccentric disc to a substantially generally radially directed movement such that said intermediate means thereby imparts a generally radially directed force to said resilient means in resiliently resisting relative rotation between said two half coupling means, whereby said two rotatably half coupling means are thereby resiliently coupled.

2. A rotationally elastic coupling according to claim 1, wherein said intermediate means imparts a generally radially outwardly directed force to said resilient means to compress said resilient means in resiliently resisting relative rotation between said two coupling halves.

3. A rotationally elastic coupling according to claim 1, wherein said intermediate means comprises a slide block mounted on said eccentric disc and a slide cage mounted on said resilient means, said slide block being disposed in said slide cage for slidable movement in a non-radial direction.

4. A rotationally elastic coupling according to claim 3, wherein said slide block has a slide block surface slidable on a slide cage surface on said slide cage, said slide block surface and said slide cage surface being generally perpendicular to a radial line of the rotationally elastic coupling.

5. A rotationally elastic coupling according to claim 3, wherein said slide cage has cage surfaces disposed about said slide block, said slide block having two spaced and opposed surfaces slidable on two spaced and opposed slide cage surfaces, said slide block having two other spaced and opposed surfaces which are spaced from one another a distance greater than the distance between two other spaced and opposed slide cage surfaces such that said slide block is slidable relative to said slide cage in a direction perpendicular to the radial direction but is not slidable relative to said slide cage in a radial direction.

6. A rotationally elastic coupling according to claim 3, wherein said slide cage is fixedly mounted onto said resilient means.

7. A rotationally elastic coupling according to claim 3, wherein there are at least two eccentric discs and said intermediate means comprises a slide cage and a slide block associated and operable with each of said eccentric discs.

8. A rotationally elastic coupling according to claim 1, wherein said rotationally elastic coupling is used in an automobile drive system.

9. A rotationally elastic coupling according to claim 1, wherein there are a plurality of eccentric disc elements.

10. A rotationally elastic coupling according to claim 1, wherein said resilient means comprises an elastomer.

11. A rotationally elastic coupling comprising two rotatable half coupling means, an eccentric disc mounted on one of said half coupling means, said eccentric disc being displaced along a translatory path of travel upon rotation of said one half coupling means, resilient means mounted on said other half coupling means, rigid means disposed generally radially inwardly of said resilient means, a connecting rod operably and relatively movably connected to said eccentric disc and operably and relatively movably connected to said rigid means for transforming the translatory movement of said eccentric disc to a substantially generally radially directed movement such that said resilient means is subjected to a generally radially directed force in resiliently resisting relative rotation between said two half coupling means, whereby said two rotatably half coupling means are thereby resiliently coupled.

12. A rotationally elastic coupling according to claim 11, wherein said connecting rod imparts a generally radially inwardly directed force to said resilient means to radially inwardly extend said resilient means in resiliently resisting relative rotation between said two half coupling means.

13. A rotationally elastic coupling according to claim 11, wherein said connecting rod imparts a generally radially outwardly directed compression force to said resilient means in resiliently resisting relative rotation between said two half coupling means.

14. A rotationally elastic coupling according to claim 11, wherein said bearing is disposed on the outer periphery of said eccentric disc.

15. A rotationally elastic coupling according to claim 11, wherein there are two eccentric discs, one of said eccentric discs being 180 degrees offset relative to the other eccentric disc.

16. A rotationally elastic coupling according to claim 11, wherein said resilient means comprises an elastomer member, said rigid means comprising a bearing shell mounted on said elastomer member, said connecting rod being operably and movably connected to said bearing shell.

17. A rotationally elastic coupling according to claim 16, wherein said bearing shell is vulcanized to said elastomer member.

18. A rotationally elastic coupling according to claim 16, wherein said elastomer member has an inner radial surface of a generally partial cylindrical configuration and an outer radial surface of a generally partial cylindrical configuration, said bearing shell being mounted on the inner radial surface, said other half coupling means being mounted on said outer radial surface.

* * * * *